(12) United States Patent
Rutkowski

(10) Patent No.: US 7,311,321 B2
(45) Date of Patent: Dec. 25, 2007

(54) WHEEL MOUNTING AND DRIVE ARRANGEMENT FOR A CYCLE, ESPECIALLY FOR A RECUMBENT BICYCLE

(75) Inventor: Gerd Rutkowski, 2302 Emily Crescent, Cornwall (CA) K6H 7H5

(73) Assignee: Gerd Rutkowski, Cornwall, Ontario (CA)

( * ) Notice: Subject to any disclaimer, the term of this patent is extended or adjusted under 35 U.S.C. 154(b) by 449 days.

(21) Appl. No.: 11/083,756

(22) Filed: Mar. 21, 2005

(65) Prior Publication Data

US 2006/0001232 A1    Jan. 5, 2006

Related U.S. Application Data

(63) Continuation-in-part of application No. 10/880,016, filed on Jun. 30, 2004.

(51) Int. Cl.
*B62M 1/02* (2006.01)
(52) U.S. Cl. ............... 280/259; 280/249; 280/260; 280/261; 280/279; 280/276; 280/277
(58) Field of Classification Search ............... 280/259, 280/249, 260, 261, 276, 277, 279
See application file for complete search history.

(56) References Cited

U.S. PATENT DOCUMENTS

| | | | |
|---|---|---|---|
| 2,505,464 A * | 4/1950 | Debuit | 280/260 |
| 3,910,599 A | 10/1975 | Thomas | 280/234 |
| 4,170,369 A | 10/1979 | Strutman | 280/261 |
| 4,270,766 A * | 6/1981 | Thomas | 280/234 |
| 4,303,255 A * | 12/1981 | Thomas | 280/234 |
| 4,773,663 A | 9/1988 | Sawyer et al. | 280/261 |
| 6,349,784 B1 | 2/2002 | Van der Heide | 180/219 |
| 6,419,254 B1 | 7/2002 | Langen | 280/260 |

* cited by examiner

*Primary Examiner*—Lesley D. Morris
*Assistant Examiner*—Marlon Arce-Diaz

(57) ABSTRACT

A cycle that has two fixed frame arms extending down on each side of the head tube axis, and a steering arm rotatably mounted in the head tube extends down between the frame arms and has a laterally off-set lower portion. A mounting member is fixed to the lower end of the steering arm and has a hollow cylindrical wheel support section which carries the inner portion of a bearing or bearings for the front wheel, allowing this wheel to rotate while being steerable by the steering arm. A fixed pedal axle extends freely through the hollow wheel support section and is rotatably supported by lower ends of the frame arms, this axle being connected by drive means to one of the cycle's front or rear wheels. Parts of the mounting member have an enlarged interior space relative to that in the wheel support section to accommodate steering movement of the mounting means relative to the pedal axle.

16 Claims, 7 Drawing Sheets

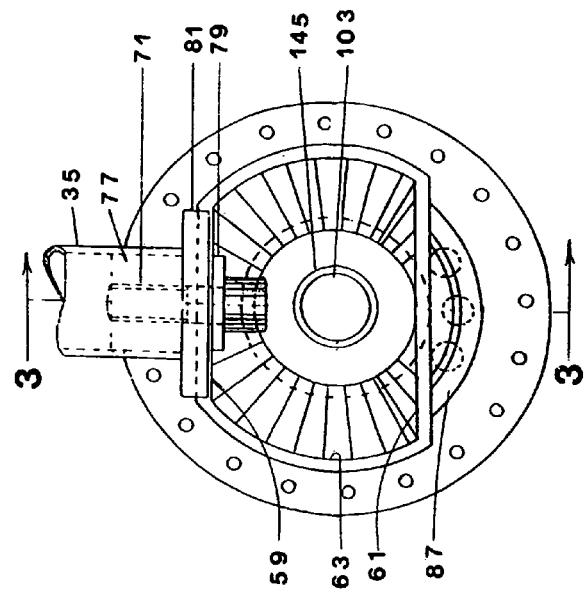
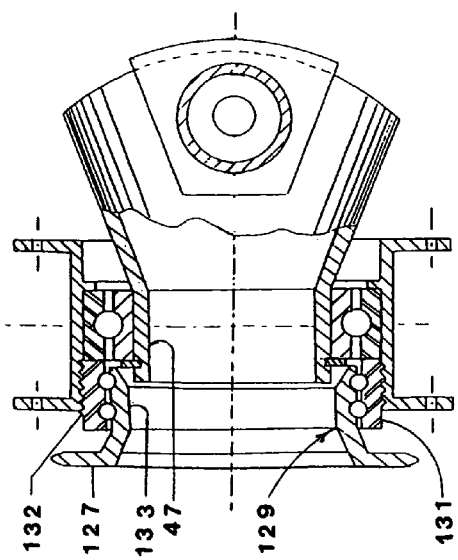
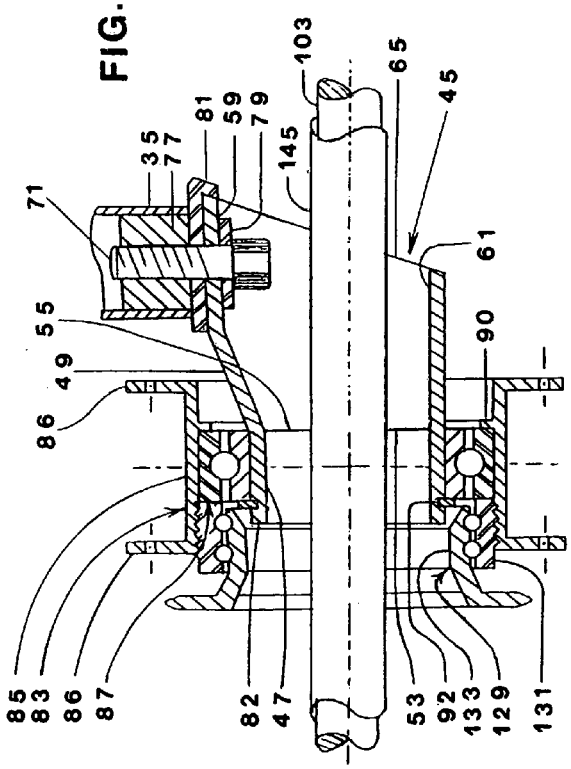

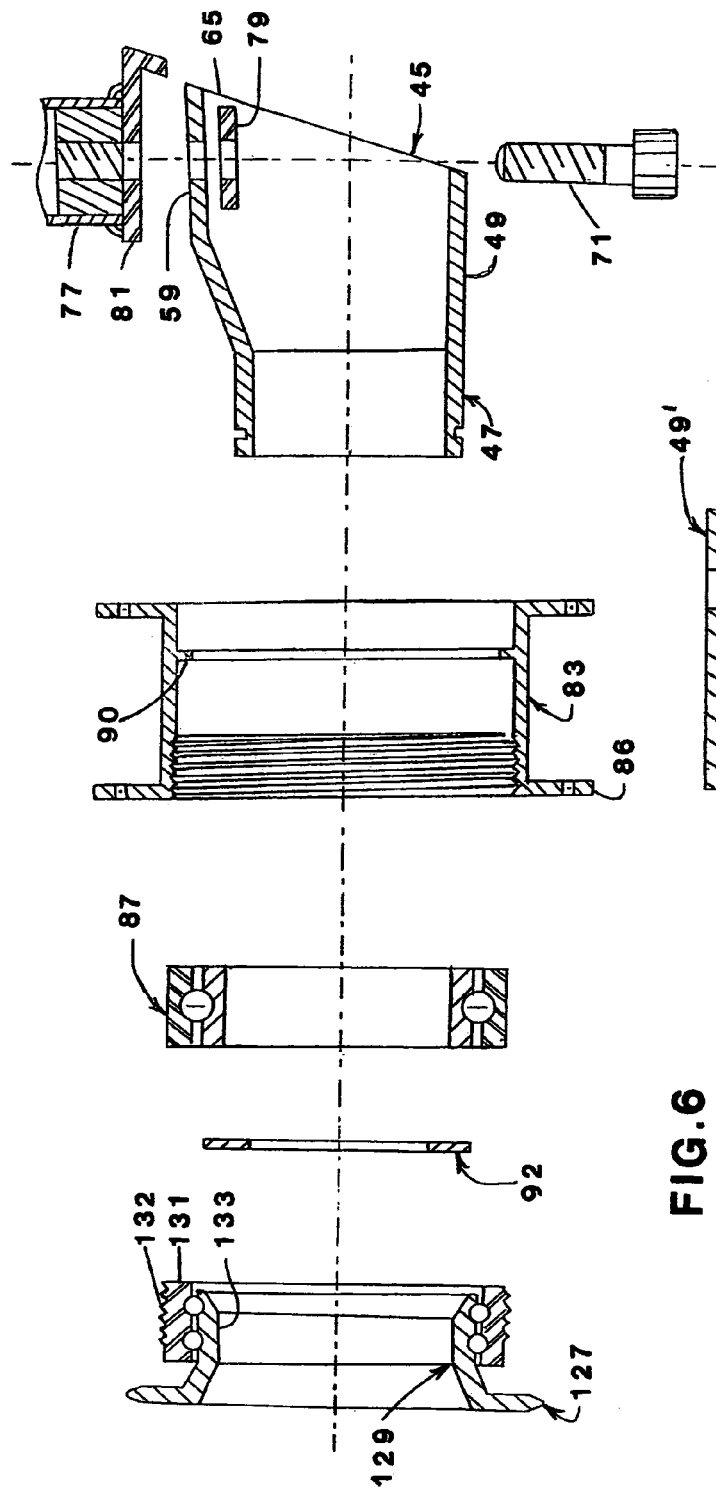
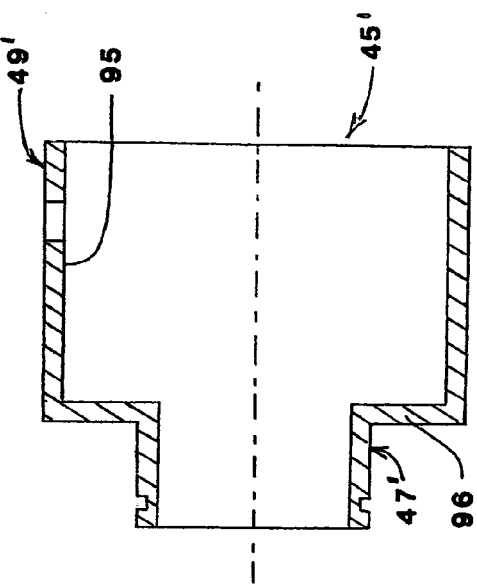
FIG.6
FIG.7

WHEEL MOUNTING AND DRIVE ARRANGEMENT FOR A CYCLE, ESPECIALLY FOR A RECUMBENT BICYCLE

CROSS-REFERENCE TO RELATED APPLICATION

This application is a continuation-in-part of my application Ser. No. 10/880,016, filed Jun. 30, 2004.

BACKGROUND OF THE INVENTION

1. Field of the Invention

This invention relates to a cycle wheel mounting and drive arrangement, particularly for a recumbent bicycle of the type having a relatively low seat. The invention provides a front wheel mounting, pedal arrangement, and drive means which are particularly suited to such a bicycle. The invention may also be used for a tricycle, and the term "cycle" as used herein will be understood as including a tricycle.

2. Prior Art

Conventional bicycles have pedals situated between the front and rear wheels, and positioned quite close to the ground. However, various forms of recumbent bicycles have been proposed and made which allow a cyclist to have a low seat with a feet forward position; this usually involves having pedals which are well forward and raised above the conventional pedal position. Some such bicycles have a long wheelbase with the pedals in front of the cyclist and the front wheel in front of the pedals. Shorter wheelbase recumbent bicycles may have the pedal axle above, or partly above and in front of, or partly above and behind, the front wheel axle; this normally necessitates a fairly small front wheel. Short wheelbase bicycles are easier to turn than long wheelbase bicycles and are therefore better suited for city use.

There are also known prior designs of short wheelbase recumbent bicycles of the type where the pedal axle goes through the front wheel hub.

In one prior design of the latter type the pedal axle is fixed relative to the front wheel axle, as in a child's bicycle, so pedaling would be difficult at other than small steering angles. In others, the axis of the pedal axle remains fixed relative to the frame as the front wheel pivots. The fixed pedal axle type of design may include a drive chain which directly connects the pedal axle to the rear wheel; this would interfere with the front wheel unless the steering angle of the front wheel is closely restricted. In another design, a gear drive is proposed between the pedal axle and the front wheel; however this results in the front wheel hub being unusually large, and this would cause more bearing friction than is desirable in a human powered vehicle such as a bicycle. In both these fixed axle designs the inside diameter of the front wheel bearing is at least 4 times, and usually at least 5 times, the diameter of the pedal axle, and may be more than 7 times the pedal axle diameter.

The wheel mounting arrangement of the present invention, as in my co-pending application, preferably makes use of a single steering arm to support the front wheel axle, instead of the usual front fork. A single steering arm is also found in U.S. Pat. No. 4,170,369, issued Oct. 9, 1979 to Strutman. However, Strutman is only concerned with a wheel mounting that allows a wheel to be easily changed, and does not show a front wheel hub which could accommodate a pedal axle.

SUMMARY OF THE INVENTION

It is an object of the present invention to provide a wheel mounting for a cycle of the type having a fixed pedal axle passing through the front wheel hub, and which provides an efficient low friction bearing for the front wheel, this bearing being of small diameter relative to those of the prior art designs referred to above having a fixed pedal axle. It is a further object to provide a wheel mounting of this type in which steering motion of the front wheel is not unduly restricted, so that the cycle is suitable for city use. It is also an object of the invention to provide a drive mechanism that does not involve making a large hub with consequent high friction.

In my copending application aforesaid, the front wheel is supported by a single steering arm, the lower end of which carries a mounting member which includes a laterally extending, hollow cylindrical wheel support member that extends part way into the front wheel hub and which supports the outer race of a single wheel support bearing, in the form of a ball bearing. The inner race of the bearing surrounds an internal bearing support member of the wheel hub that is connected to the main part of the hub by an annular member. The internal bearing support member is hollow to accommodate the pedal axle, and its hollow interior diverges from its longitudinal center in conical manner to allow for steering movement of the hub relative to the stationary pedal axle. To allow for the use of a relatively small bearing with an adequate diameter of pedal axle, along with a good steering angle, the length of the internal bearing support is minimised by use of only a single bearing.

In the present invention, the bearing arrangement is changed so that the wheel support member supports the inner, rather than the outer, race of the bearing means, and the outer race supports the wheel hub. Since, in this case, the part, i.e. the mounting member, which holds the inner race of the bearing, is non-rotational, it can be made in a shape which is partly non-circular, for example laterally recessed, so as to accommodate the fore-and-aft steering movement of the front wheel hub relative to the stationary pedal axle, while also being shaped to provide good strength with minimal radius of the bearing supporting part. It can also more easily accommodate two side-by-side bearings. The inner diameter of the bearing or bearings is about 2 times, being preferably less than 3 times, and most preferably less than 2.5 times, the pedal shaft diameter. The hub may be less than 5 times, and in some cases less than 4 times, the pedal shaft diameter.

In accordance therefore with one aspect of the present invention, in a cycle having:

a frame, the frame supporting a rear wheel, the frame having a top head tube, and two fixed frame arms extending down from the frame adjacent the head tube, with one frame arm on each side of the head tube;

a steering arm rotatably mounted in the head tube and extending down between the frame arms and alongside one of the frame arms, a lower portion of the steering arm below the head tube being laterally off-set from the head tube;

a mounting member fixed to the lower end of the steering arm, the mounting member extending transversely from the steering arm towards the other frame arm and having a hollow cylindrical wheel support section adjacent the head tube axis, a front wheel with a cylindrical hub and annular bearing means connecting the hub to the cylindrical support section of the mounting member so as to have the front wheel rotatable about the axis of the wheel support section while being steerable relative to the frame arms by the steering arm about the head tube axis;

a pedal axle extending freely through said mounting member and supported by lower ends of said frame arms, said pedal axle being provided with pedals outside of the frame arms and being connected by drive means to one of said wheels;

the cycle is characterized in that the cylindrical wheel support section of the mounting member carries the inner race or races of the bearing means, the outer race or races of which are connected to said front wheel hub, and in that parts of the mounting member between the bearing means and the steering arm have an enlarged interior space relative to that in the wheel support section to accommodate steering movement of the mounting member relative to the pedal axle.

Preferably, the steering arm terminates above the pedal axle, and the mounting member includes a mounting section attached to the bottom of the steering arm, and an intermediate section connecting the mounting section to the wheel support section, said intermediate section having a diverging hollow interior.

The intermediate section may have partly conical fore-and-after sides diverging from said wheel support section towards the mounting section. The mounting section may comprise a flattened top area connecting the intermediate section to the steering arm. alternatively, the mounting section may be part of a relatively large tubular member connected to the smaller diameter wheel support section by a radially extending plate constituting the intermediate section; this plate may for example be an annular plate connecting the cylindrical wheel support section to a larger diameter cylindrical, tubular part.

Preferably a single steering arm is used, which supports the mounting member in cantilever manner, as in my co-pending application.

In my co-pending application as aforesaid the drive means includes a first drive chain connecting a sprocket on the pedal axle to transfer sprocket means mounted adjacent one of said frame arms above the outer perimeter of the front wheel, and a second drive chain connecting the transfer sprocket means to a sprocket wheel rotatable with the front wheel; this second drive chain is designed to twist to accommodate steering movement between the front wheel and the frame arms. In accordance with the present invention the drive means may be connected either to the front or rear wheels.

Thus, in accordance with another aspect of the present invention, in a cycle having:

a frame, the frame supporting a rear wheel, the frame having a top head tube, and two fixed frame arms extending down from the frame adjacent the head tube, with one frame arm on each side of the head tube;

a steering arm rotatably mounted in the head tube and extending down between the frame arms and alongside one of the frame arms, a lower portion of the steering arm below the head tube being laterally off-set from the head tube;

a mounting member fixed to the lower end of the steering arm, the mounting member extending transversely from the steering arm towards the other frame arm and having a hollow cylindrical wheel support section adjacent the head tube axis, a front wheel with hub and annular bearing means connecting the hub to the mounting member to have the front wheel rotatable about the mounting member between the frame arms while being steerable relative to the frame arms by the steering arm about a steering axis;

pedal means mounted on the bottom ends of the frame arms, the pedal means having a pedal axle passing freely through the mounting member adjacent the bottom end of the steering arm;

and drive means connecting the pedal axle to one of the wheels to rotate the one wheel when pedaling;

the cycle is characterized by said drive means including a drive sprocket fixed to said pedal axle, a first drive chain connecting said drive sprocket to transfer sprocket means mounted adjacent one of said frame arms substantially above the outer perimeter of said front wheel, and a second drive chain connecting the transfer sprocket means to one of said front or rear wheels;

the arrangement being such that said first drive chain extends generally close to the steering axis of said steering post and accordingly does not interfere with steering movement of the front wheel.

As in my co-pending application, the second drive chain may be connected to a sprocket rotatable with the front wheel, said second chain being arranged to twist to accommodate steering movement of the front wheel.

However, in an alternative arrangement, the second drive chain may be arranged to drive a sprocket rotatable with the rear wheel, said second drive chain being wholly outside the perimeter of said front wheel so as not to limit steering movement of said front wheel. This avoids any twisting of a chain and eliminates the need for a sprocket on the front wheel hub.

A frame arm reinforcement member can be provided between the frame arms, in the form of a non-rotating sleeve surrounding the pedal shaft and connecting the lower ends of the frame arms, to strengthen the structure. Connecting means can also be provided between the steering arm and the adjacent frame arm above the mounting member to strengthen the steering arm. The connecting means are constructed to allow the steering arm to swivel relative to the frame while maintaining a sliding connection to the frame arm.

BRIEF DESCRIPTION OF THE DRAWINGS

Preferred embodiments of the invention will now be described by way of example with reference to the accompanying drawings, in which:

FIG. 3 is a detail front view, in section, showing the front wheel hub mounted on the steering arm, and also showing the pedal axle;

FIG. 4 is an end view on lines 4-4 of FIG. 3;

FIG. 5 is partly sectioned top view of the parts shown in FIG. 3;

FIG. 6 is an exploded view of some of the elements shown in FIG. 3

FIG. 7 is a sectional view of another embodiment of the mounting member:

DETAILED DESCRIPTION

Figure 1:
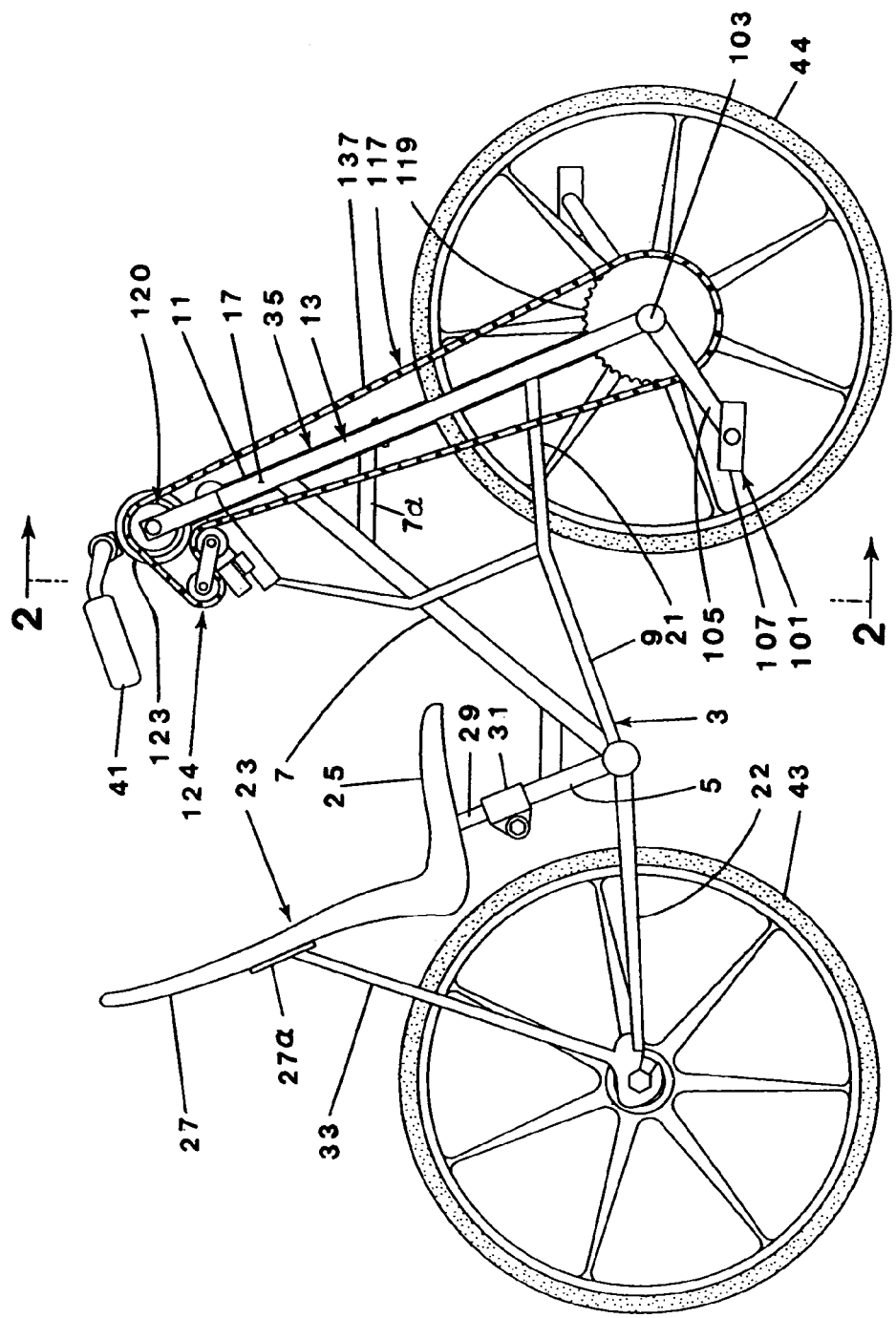
FIG. 1 is a side view of a first embodiment of a bicycle having a front wheel drive.
Figure 2:
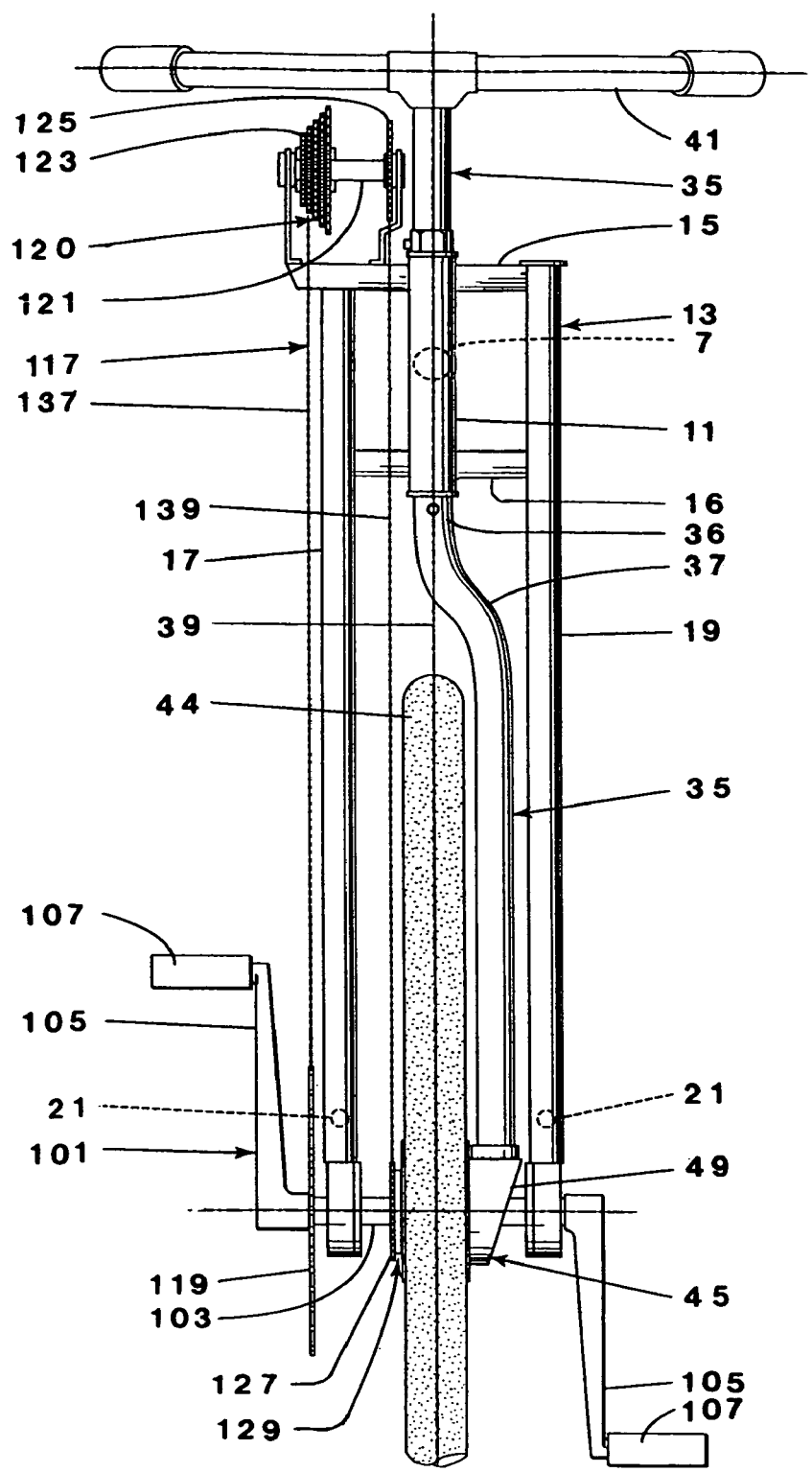
FIG. 2 is a partial front view of the bicycle.

The bicycle of the embodiment shown in FIGS. 1 to 7 has a frame 3 with an upwardly and slightly rearwardly directed seat tube 5. Top and bottom frame members 7 and 9 extend upwardly and forwardly from the bottom of the seat tube 5 to a head tube 11 and to the lower part of a front fork 13; the head tube is also braced by short frame member 7a. As seen in FIG. 2, the front fork 13, which is fixed to the frame, is supported by lateral, top cross-members 15 fixed near to the top of each side of head tube 11, and by similar cross-members 16 welded to sides of the lower end portion of the head tube.

As seen in FIG. 1, both the head tube 11 and the front fork are aligned in side view, and extend slightly forwardly and downwards. The front fork 13 has two parallel frame arms 17, 19, one on each side of the head tube 11. The lower frame member 9 is forked at its front end, with the front two forks 21 of this member being connected to the lower portions of the frame arms 17, 19 of the front fork. The frame also has a rear fork 22 extending rearwardly from the bottom of the seat tube 5, the rear end of the fork 22 holding the hub of rear wheel 43.

The bicycle has a seat 23 mounted on the seat tube 5. Because the frame is open, not being closed by a conventional crossbar, the seat 23 can be located lower down on the frame than in the conventional bicycle. The seat 23 is of the bench type having a seat portion 25 and a back portion 27. The seat portion 25 is located to be about 3 to 5 inches below the tops of the wheels of the bicycle. The seat 23 is mounted on a seat mounting post 29 inserted into the seat tube 5, and a clamp 31 on the seat tube 5 locks the seat 23 at the chosen height. Seat stays 33 extend upwardly from the rear of the rear fork 22 to a plate 27a on the back portion 27 of the seat. The plate 27a can be adjustably mounted on the back portion allowing the height of the seat to be adjusted. The location of the seat 23 places the rider in a slightly recumbent position with his legs extending forwardly when pedaling, as will be described.

As seen in FIG. 2, a steering arm 35 has an upper portion 36 extending down through the head tube 11, the arm having a lower main portion 37 off-set to one side just below the tube 11, and extending downwardly parallel to the longitudinal steering axis 39 of the head tube 11 but spaced a short distance from it. Handlebars 41 are connected to the top of the steering arm above the head tube 11. The steering arm is pivotable by the handlebars in the tube 11 about the steering axis 39 and moves between the frame arms 17,19. A front wheel 44 is rotatably mounted to the lower end of the steering arm 35 as will be described, the front wheel 44 being centered with respect to the steering axis 39 and adjacent the steering arm 35.

The front wheel 44 is mounted in cantilevered fashion to the lower end of the steering arm 35 by a mounting member 45 shown in FIG. 3 to 5. The mounting member 45, as shown in these drawings, has an outer, cylindrical, tubular wheel support section 47. The wheel support section extends axially from an intermediate section 49, which intermediate section leads to a flattened top area 59 providing a mounting section used to connect the intermediate section 49 to the steering arm 35. The intermediate section 49 is tubular having an inner end 53 that is circular and that is the same size as the circular inner end 55 of the wheel support section 47, these inner ends being attached together. The intermediate section has a flattened bottom wall 61, and in accordance with one aspect of the invention its sides 63 are partly conical and flare outwardly from the inner end 53 towards the outer end 65 in lateral manner with respect to the front and rear of the axis of the wheel support section 47. The flat topped mounting section 59 is connected to the lower end of the steering arm 35, with the axis of the wheel support section 47 transverse to the steering arm, by a bolt 71 passing through a hole in the mounting section 59 into a threaded hole in a mounting block 77 fixed in the lower end of the steering arm 35. An inner support plate 79, having a hole for the bolt 71,can be mounted within the flattened mounting section 59, the bolt 71 passing through the hole in the plate. An outer support plate 81 is welded onto the lower end of the steering arm 35 against which the mounting section 59 can be located when being connected to the steering arm, the plate 81 also having a hole for the bolt. The support plate 81 can extend past the steering arm to support the cantilevered mounting member 45 against upward forces. The outer end 65 of the mounting member 45 can be angled to provide easier access to the bolt 71, the end 65 extending downwardly and inwardly towards the steering axis 39. The outer end 82 of the wheel support section 47 is parallel to the steering axis 39.

While one arrangement has been used to connect the mounting member 45 to the steering arm 35, other arrangements can be used. The outwardly diverging, or flaring, tubular intermediate section 49 allows steering of the bicycle with a pedal axle passing through the mounting member as will be described.

The front wheel 44 has a central hub 83 defined by a cylindrical, tubular member 85. The tubular member 85 is centered with respect to the steering axis 39 (FIG. 2) when the wheel is mounted, and it has a radially outwardly directed flange 86 on each side to which the wheel spokes (not shown) of the front wheel are attached.

The front wheel 44 is rotatably mounted on the mounting member 45 by inserting the wheel support section 47 of the mounting member 45 within the wheel hub 83, these parts being separated by bearing means 87. The bearing means 87 here comprise a single, annular ball bearing 89 having its inner race fitted onto the wheel support 47 and its outer race fitted within the wheel hub 83 to rotatably connect the wheel 44 to the mounting member. The bearing means 87 can be held in place by stop shoulders, such as that shown at 90 formed in the inner surface of the hub and which cooperates with the outer annular body 131 of the sprocket carrier 129 discussed below, and by a similar shoulder in the outer surface of the wheel support section along with the c-clip 92.

While one form of mounting member with an enlarged hollow interior has been described, other forms could be used. For example, as shown in FIG. 7, the mounting member 45' can have a mounting section 49' that comprises a cylindrical, tubular member 95 which is larger in diameter than the wheel support section 47' An intermediate member comprising a radial, annular wall or plate 96 joins the inner end of the member 95 to the inner end of the wheel support section 47'. The mounting section 49' is attached to the steering arm 35 via the top portion of its wall 97 in the same manner that the mounting member 45 was attached. The circular enlarged mounting section allows the mounting member and the attached front wheel to be pivoted relative to the pedal axle as will be described. The tubular member 95, instead of being cylindrical, may also be non-circular, for example square or rectangular.

Pedal means 101 are provided for operating the bicycle. The pedal means 101, as shown in FIGS. 1 and 2, has a pedal axle 103 that extends through the bottom ends of the frame arms 17,19 and is rotatable in bearings, not shown, held by these arms. Each end of the pedal axle 103 has a pedal arm 105 non-rotatably mounted thereon, with a pedal 107 at the end of the arm. The pedal arms 105 and pedals 107 are located outside the frame arms 17, 19.

The pedal axle 103 passes freely through both the wheel hub 83 and the mounting member 45 as shown in FIG. 3; there is no connection between the pedal axle 103 and the wheel hub 83. The front wheel can easily be pivoted, through a total steering angle of about 50 degrees, because the diameter of the axle 103 is substantially less that the inner diameter of the wheel support section 47. The inner diameter of the wheel support section 47 is at least twice as great as the diameter of the axle 103 and preferably is about two and one half times as great to provide sufficient clearance for the wheel to pivot, through the desired steering angle, without interfering with the axle. The relative dimensions given are for a hub having an axial length about twice as large as the axle diameter.

It will be obvious that the intermediate section 49 extending from one side of the hub 83 is laterally enlarged at the front and rear sides, relative to the wheel support section 47, to provide clearance for the wheel 44 and its support member 45 to pivot relative to the pedal axle 103. It will also be obvious that the bottom end of the steering arm 35 must be located sufficiently above the pedal axle 103 to provide clearance for the steering arm 35 above the axle 103 as it moves to pivot the attached mounting member and front wheel relative to the axle when steering the bicycle.

Drive means 117 connect the pedal means 101 to one of the wheels of the bicycle, in this embodiment the front wheel, to drive it. The drive means 117 comprises chain and sprocket drives and includes a drive sprocket 119 fixedly mounted on the pedal axle 103 just outside the frame arm 17. As shown in FIG. 1, the drive sprocket 119 is connected by drive means 117 to the front wheel 44. A first transfer sprocket means 120 is mounted above the drive sprocket 119 on sprocket shaft 121 mounted on the frame 3 just below the handlebars 41. The first transfer sprocket means can comprise a set of speed change sprockets 123 mounted on one end of the sprocket shaft 121. The speed change sprockets 123 connect to the sprocket shaft 121 in the forward direction of rotation but freewheel on the shaft in a rearward direction of rotation allowing reverse pedaling.

A derailleur gear shift mechanism 124, mounted on the frame 3, is located behind the speed change sprockets 123 as shown in FIG. 1. The sprocket shaft 121 is mounted, by means of brackets, above the cross bar 15 connecting the frame arms 17, 19 to the head tube 11, and is located just below the handlebars 41 and to one side of the head tube. Second transfer sprocket means in the form of a transfer sprocket 125 is fixedly mounted on the other end of the sprocket shaft 121. A driven sprocket 127 is mounted on a tubular sprocket carrier 129 held by the front wheel hub 83.

The sprocket carrier 129 is shown in FIGS. 3, 5 and 6 and has an outer annular body 131 with threads 132 on its outer surface. The driven sprocket 127 is attached to an inner annular body 133 concentric within the outer body 131. The inner body 133 is mechanically connected to the outer body 131 by a free-wheel mechanism (not shown) so that the sprocket 127 connects with body 131 in the forward direction when rotated in the forward direction to rotate the front wheel. The sprocket 127 can also remain stationary while the front wheel rotates. The sprocket carrier 129 is separate from the mounting member 45 and is not connected with it. The inner body 133 can be machined to provide sufficient clearance for the wheel to swivel relative to the pedal axle through a total angle of 50°, i.e. 25° from each side of the central position. The outer body 131 is threadedly mounted onto the inner threaded surface of the hub 83.

The drive means 117 include a first chain 137 which connects the drive sprocket 119 to the speed change sprockets 123. A second chain 139 connects the transfer sprocket 125 to the driven sprocket 127. Operating the pedal means 101 will rotate the front wheel 44 through the drive means 117 to propel the bicycle; the chain 139 is twisted slightly in steering but this is acceptable given that the total angle of steering of the steering arm is limited to about 50°. The chain 139 twists about ½ degree per link at the maximum steering angle.

It will be seen that the sprocket carrier 129 is located close to the steering axis. In this embodiment, the bearing means 87 can be closely adjacent to the carrier 129 and also close to, and preferably aligned with, the steering axis 39.

The location of the speed change sprockets 123 adjacent the handlebars 41 allows the driver to use a hand to easily change the gear ratio of the drive means 117 and also to clearly see which gear is to be selected to provide the desired gear ration. While the first transfer sprocket means 120 has been shown as a set of speed change sprockets 123 it could also be a single sprocket.

The construction described, using a single steering arm between the frame arms and a cantilevered support for the front wheel provides a relatively compact and light weight front wheel drive for the bicycle. The bicycle is efficiently driven with a large front wheel, with the front wheel rolling on a single bearing, and is easily steerable through a reasonable steering angle, say at least 45° (total angle), and preferably about 50°, without interference from the pedal means. The necessary twisting of the chain 139 of the drive means passing between the sprocket shaft and the driven sprocket 127 is not enough to affect operation of the bicycle given the limitation of about 50° for the total steering angle. The location of the pedals makes it comfortable for the driver to propel the bicycle from a recumbent position. Clearly a similar design can be used for a tricycle.

FIGS. 8 to 11 show the second embodiment of the invention having a generally similar pedal arrangement, but one in which the drive chains provide a rear wheel drive.

Figure 8:
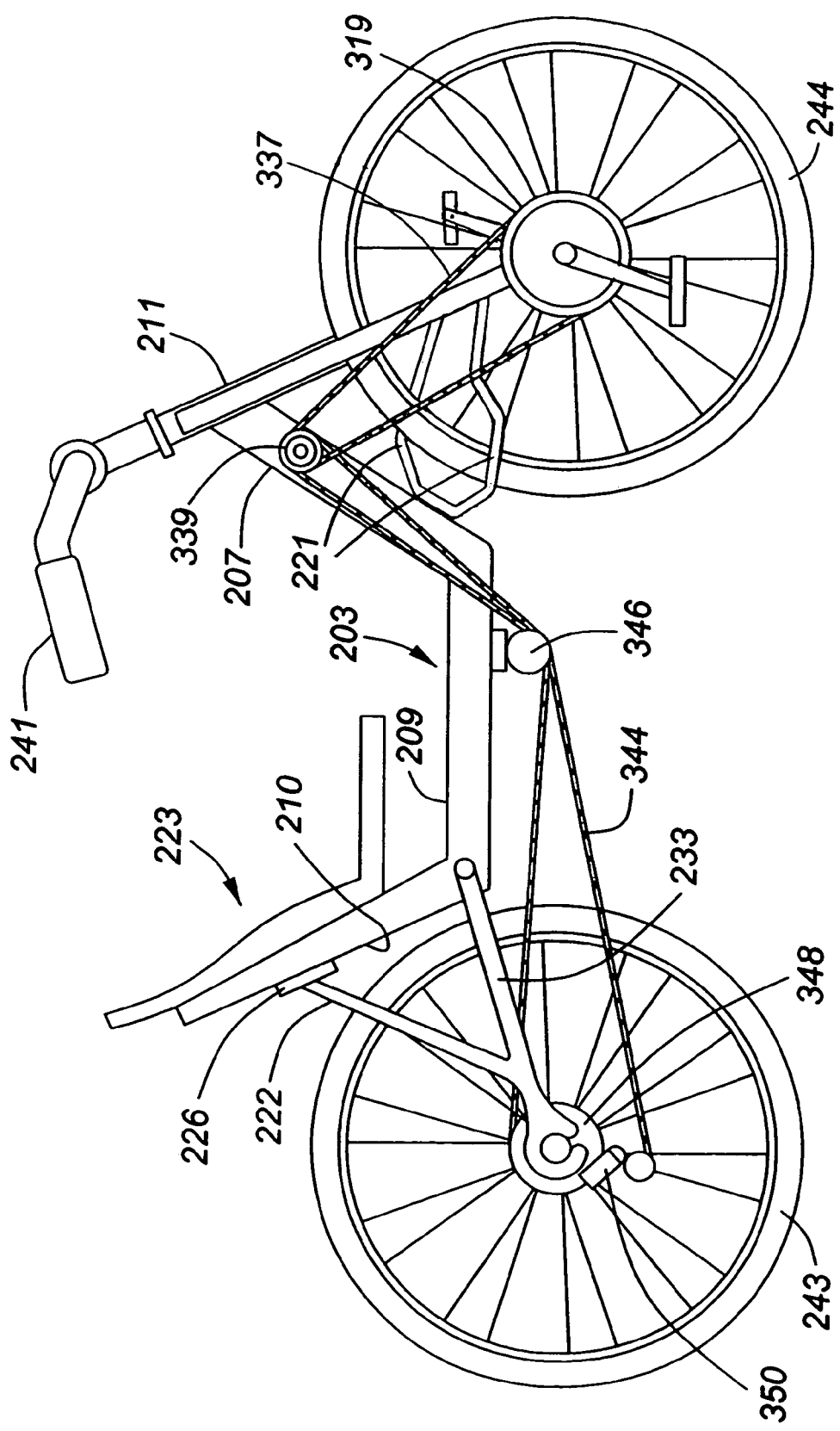
FIG. 8 is a side view of a second embodiment of bicycle, having a rear wheel drive.
Figure 9:
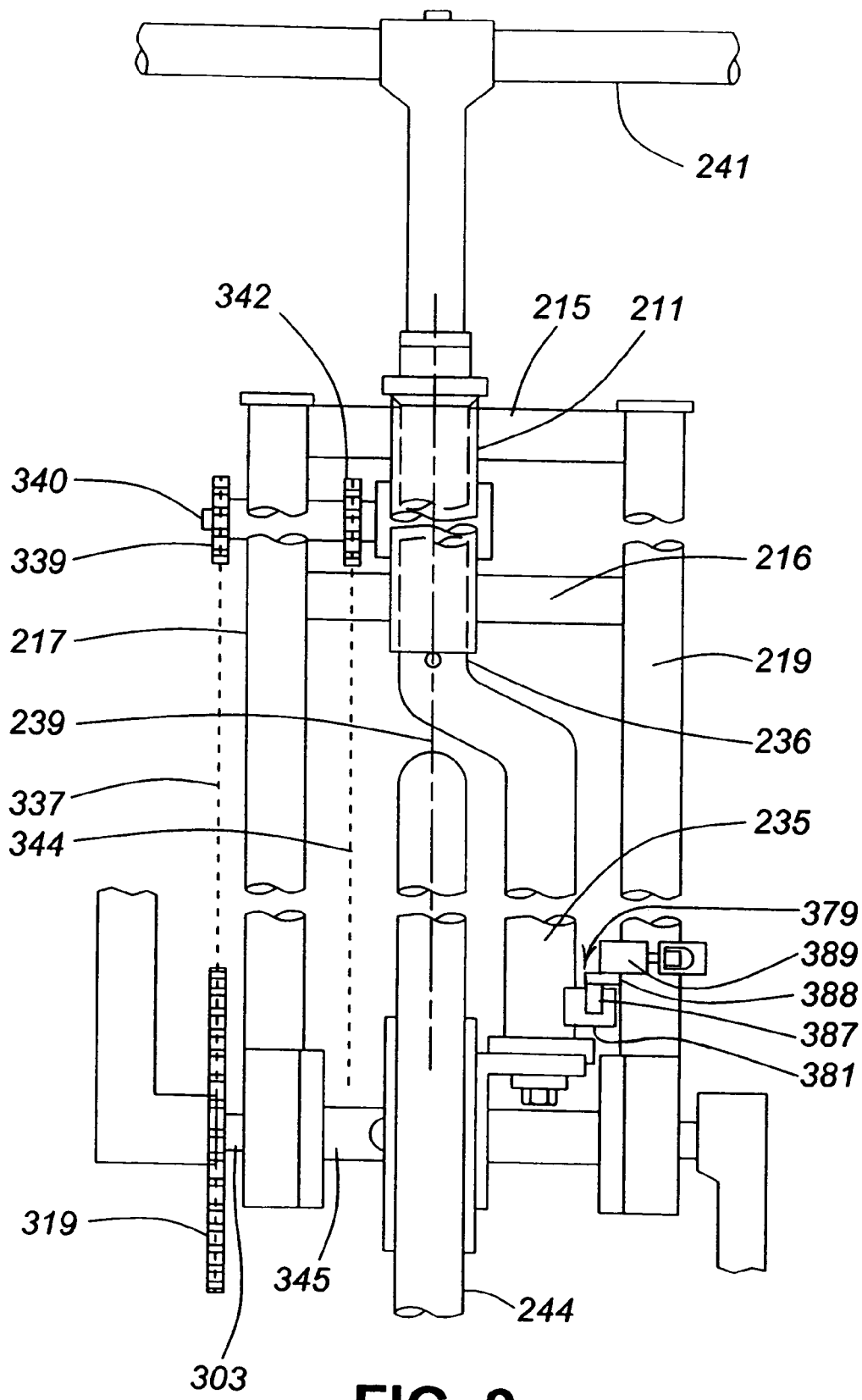
FIG. 9 is a partial front view of the second embodiment of bicycle.

As shown in FIGS. 8 and 9, the rear wheel drive bicycle has a longitudinal frame 203 formed of hollow square tubing and including a front member 207 sloping upwardly from the front end of a horizontal base member 209, the member 207 leading to a head tube 211. As before, the head tube 211 is fixed to laterally extending upper cross members 215 shown in FIG. 9 and which hold the upper ends of fixed frame arms 217 and 219, and similar lower cross-members 216 are welded between the head tube 211 and the arms 217 and 219. These frame arms are similar to arms 17, 19 of the first embodiment and slope down to a front wheel hub along axes parallel to that of the head tube 211. Lower portions of these arms 217, 219 are braced by fork members 221 extending forwardly from the lower portion of frame member 207. Again as in the first embodiment, the head tube rotatably holds the upper portion 236 of a steering arm 235 which is pivotable about the axis 239 of the head tube by means of handlebars 241. Steering arm 235 extends downwardly to hold the bearing means for the hub of the front wheel 244; these parts will be further described below with reference to FIGS. 10 and 11. To the rear portion of frame member 209 is fixed an upwardly sloping frame part 210 carrying seat support member 226, this member 226 holding the back of a seat 223. Braces 222 and 233 provide a triangulated support between the frame parts 209 and 226 for bearing means holding the hub of rear wheel 243.

Figure 10:
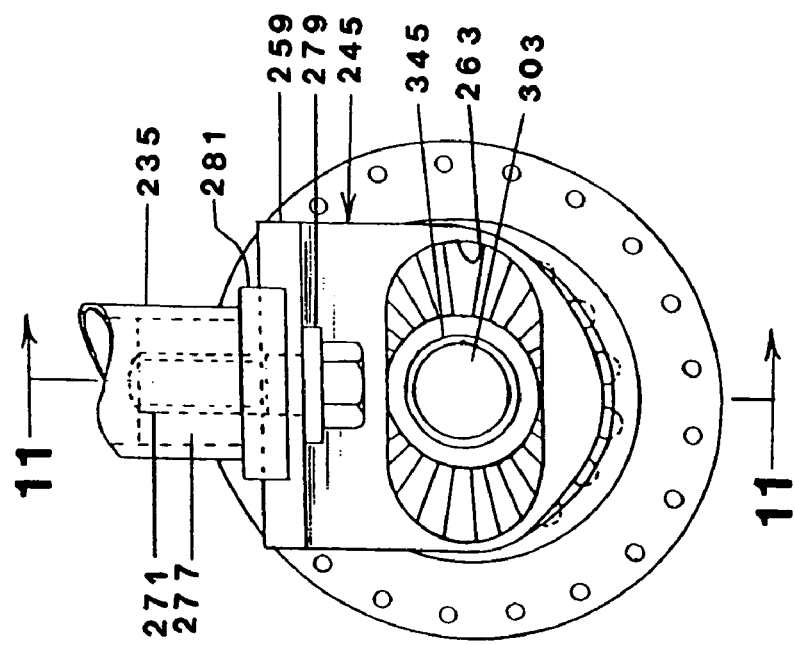
FIG. 10 is an end view of an alternative mounting member.
Figure 11:
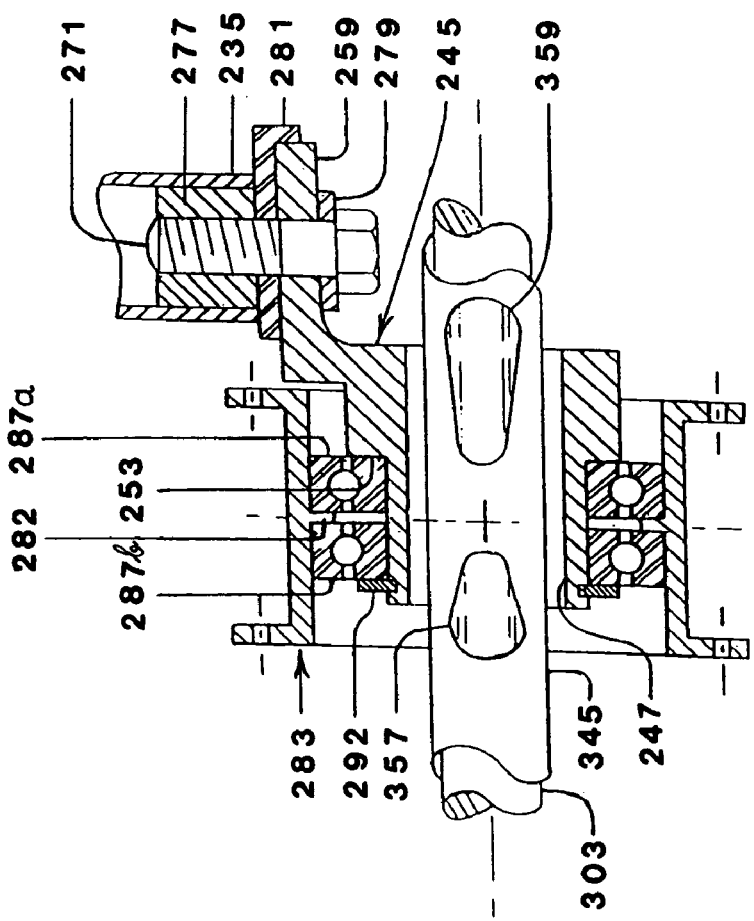
FIG. 11 is a sectional view on lines 11-11 of FIG. 10 and also showing a pedal axle with a reinforcement member.

The front wheel mounting arrangement, as shown in FIGS. 10 and 11, is generally similar to that for the first embodiment shown in FIGS. 3 to 5, but with differently shaped parts, which in this case accommodate two ball bearings side-by-side and which are located by a central rib 282 in hub 283. In this case the mounting member 245 is formed integrally with the cylindrical wheel support section 247. This part 247 is a reduced diameter inner end portion of the member 245 which has a shoulder 253 to locate the side of an inner bearing 287a, which closely abuts an outer bearing 287b held in place by C-clip 292. The enlarged diameter part of mounting member 245 leads to an integral lug 259 connected by bolt 271 to the lower end of steering arm 235. The connection between these parts involves plates and a mounting block 277 fixed in the inner end of arm 235, these parts being similar to those of the first embodiment. As will be seen in FIG. 10, the width of the mounting member is just a little less than the internal diameter of the wheel hub 283, and the fore-and-aft sides 263 of the cavity which communicates with the cylindrical interior of wheel support 247 flare outwardly from the wheel support to nearly the full width of the mounting member. As in the first embodiment this outwardly flaring shape allows the wheel mounting member 245 to be steered through a total steering angle of around 50° without interfering with the fixed pedal axle 303. Here the diameter of the pedal axle is ⅝ inch, the internal diameter of the wheel support section is 1.0 inch, the internal diameter of the bearings is 1¼ inch, and the internal diameter of the hub is 2¼ inch. Accordingly the internal diameter of the bearings is only twice the pedal axle diameter.

FIGS. 10 and 11 also show how the front fork of the bicycle can be reinforced by mounting a reinforcement member in the form of a non-rotating sleeve 345 fitted slidably over the pedal axle 303. Details of this type of reinforcing sleeve are given in my copending parent application as aforesaid. The sleeve 345 is held between the frame arms 217 and 219 of the front fork, one end of the sleeve being threadedly mounted to a flange held by frame arm 217 while the other end of the sleeve is welded to another flange which is fastened to the inside of the other frame arm 219. The central portion of the sleeve 345 is apertured on either side of center at the front and back as shown at 357 and 359. These apertures are sized and positioned to receive adjacent inner parts of the mounting member 245 and wheel support member 247. This allows good support for the pedal axle and front fork while not substantially limiting the steering angle.

FIG. 9 also shows a further feature, namely a sliding support 379 provided for the lower end of the steering arm 235; again this support is more fully described in my copending application as aforesaid. This support includes a slotted member 381 having its inner surface matching the diameter of the arm 235 and welded thereto, and having an upwardly open slot which is curved and centered on the central axis of rotation 239 of the steering arm. This slot slidably receives a fixed guide arm 387 depending from a plate 388 which itself depends from an adjustable bracket 389 held by a clamping screw to the frame arm 219 just above the member 381. The guide arm 387 is part-circular, being centered on the steering axis 239, so that the slot in member 381 can slide along this guide arm as the steering arm rotates this member 381 about the steering axis 239. This steadies the lower end of the steering arm.

The drive means in this case include a drive sprocket 319 mounted on the pedal axle 303 which is connected by a first drive chain 337 to an upper sprocket 339. The latter sprocket is mounted on an idler shaft 340 held on the frame part 207 near to the head tube 211. The position of this sprocket 339 is slightly above and outside the periphery of the front wheel, and close enough to the head tube axis that steering of the front wheel does not bring it into contact with the chain 337. The idler shaft 340 carries a second, transfer sprocket 342 which drives a second chain 344. This second chain 344 is directed by closely spaced idler sprockets 346 to a set of rear wheel sprockets 348 forming part of a standard derailleur gear having a gear change mechanism indicated at 350 and which is operated in conventional fashion from a gear change control mounted on the handlebars 241. Suitable chain guards, not shown, will be provided to protect the rider.

Two prototypes of the bicycle described have been made, and have been found to provide better performance than a standard bicycle because the applied power is not limited to the weight of the rider; the rider can use his full leg strength by pushing against the back of the seat. Because of the low seat the wind resistance is reduced, while the seat position is healthy and comfortable. Unlike some recumbent bicycles, this cycle performs well in city traffic by reason of its large steering angle and short wheelbase. Also, because of the favorable position of the pedals, the rider's feet can easily be put on the ground when the bicycle stops in traffic.

I claim:

1. A cycle having a frame, the frame supporting a rear wheel, the frame having a top head tube, and two fixed frame arms extending down from the frame adjacent the head tube, with one frame arm on each side of the head tube;

a steering arm rotatably mounted in the head tube and extending down between the frame arms and alongside one of the frame arms, a lower portion of the steering arm below the head tube being laterally off-set from the head tube;

a mounting member fixed to the lower end of the steering arm, the mounting member extending transversely from the steering arm towards the other frame arm and having a hollow cylindrical wheel support section adjacent the head tube axis, a front wheel with a cylindrical hub and annular bearing means connecting the hub to the cylindrical support section of the mounting member to have the front wheel rotatable about the axis of the wheel support section while being steerable relative to the frame arms by the steering arm and about the head tube axis;

a pedal axle extending freely through said hollow wheel support section and rotatably supported by lower ends of said frame arms, said pedal axle being provided with pedals outside of the frame arms and being connected by drive means to one of said front or rear wheels;

wherein the cylindrical wheel support section carries the inner race or races of the bearing means, the outer race or races of which are connected to said front wheel hub, and wherein parts of said mounting member occupying an area between the bearing means and the steering arm have an enlarged interior space relative to that in the wheel support section to accommodate steering movement of the mounting means relative to the pedal axle.

2. A cycle according to claim 1, wherein said steering arm terminates above the said pedal axle, and wherein said mounting member includes a mounting section attached to the bottom of the steering arm, and an intermediate section connecting the mounting section to the wheel support section adjacent said bearing means, said intermediate section having a diverging hollow interior providing said enlarged interior space.

3. A cycle according to claim 2, wherein said intermediate section has partly conical fore-and-aft sides diverging from said cylindrical wheel support section.

4. A cycle according to claim 2, wherein said mounting section comprises a flattened top area connecting the intermediate section to said steering arm.

5. A cycle according to claim 2, wherein said mounting section comprises a relatively large tubular member connected to said wheel support section by a radial plate constituting said intermediate section.

6. A cycle according to claim 1, wherein said steering arm is a single arm which supports said mounting member in cantilever manner.

7. A cycle according to claim 1, wherein said bearing means is a single ball bearing located on said steering axis.

8. A cycle according to claim 1, wherein said bearing means includes two ball bearings located symmetrically with respect to said steering axis and located close to said axis.

9. A cycle according to claim 1, wherein the inner diameter of the bearing means is less than 3 times the diameter of the pedal axis.

10. A cycle according to claim 1, wherein the inner diameter of the bearing means is less than 2.5 times the diameter of the pedal axis.

11. A cycle according to claim 1, including a non-rotating reinforcing sleeve member extending between the free ends of the frame arms and surrounding the pedal axle, the reinforcing sleeve member passing freely through the mounting member, the ends of the reinforcing member being connected to the ends of the arms.

12. A cycle according to claim 11, wherein the reinforcing member has a pair of apertures in both its front and rear sides to receive portions of the cylindrical wheel mounting section when the front wheel is pivoted relative to the pedal axle.

13. A cycle according to claim 1, wherein said drive means include a drive sprocket fixed to said pedal axle, a first drive chain connecting said drive sprocket to transfer sprocket means mounted adjacent one of said frame arms substantially above the outer perimeter of said front wheel, and a second drive chain connecting the transfer sprocket means to one of said front or rear wheels;

the arrangement being such that said first drive chain extends generally close to the steering axis of said steering post and accordingly does not interfere with steering movement of said front wheel.

14. A cycle having a frame, the frame supporting a rear wheel, the frame having a top, head tube, and two fixed frame arms extending down from the frame adjacent the head tube, with one frame arm on each side of the head tube;

a steering arm rotatably mounted in the head tube and extending down between the frame arms and alongside one of the frame arms, a lower portion of the steering arm below the head tube being laterally off-set from the head tube;

a mounting member fixed to the lower end of the steering arm, the mounting member extending transversely from the steering arm towards the other frame arm and having a hollow cylindrical wheel support section adjacent the head tube axis, a front wheel with hub and annular bearing means connecting the hub to the mounting member to have the front wheel rotatable about the mounting member between the frame arms while being steerable relative to the frame arms by the steering arm about a steering axis;

pedal means rotatably supported by the lower ends of the frame arms, the pedal means having a pedal axle passing freely through the mounting member adjacent the bottom end of the steering arm;

and drive means connecting the pedal axle to one of the wheels to rotate the one wheel when pedaling;

said drive means including a drive sprocket fixed to said pedal axle, a first drive chain connecting said drive sprocket to transfer sprocket means mounted adjacent one of said frame arms substantially above the outer perimeter of said front wheel, and a second drive chain connecting the transfer sprocket means to one of said front or rear wheels;

the arrangement being such that said first drive chain extends generally close to said steering axis and accordingly does not interfere with steering movement of said front wheel.

15. A cycle according to claim 14, wherein said second drive chain is connected to a driven sprocket rotatable with the front wheel, said second chain being arranged to twist to accommodate steering movement of the front wheel.

16. A cycle according to claim 14, wherein said second drive chain is arranged to drive a sprocket rotatable with the rear wheel, said second drive chain being wholly outside the perimeter of said front wheel so as not to limit steering movement of said front wheel.

* * * * *